US011184724B2

(12) United States Patent
Lee et al.

(10) Patent No.: US 11,184,724 B2
(45) **Date of Patent: *Nov. 23, 2021**

(54) SOUND OUTPUT DEVICE PAIRING WITH CLOSEST EXTERNAL SPEAKER AND CONTENT SOURCE

(71) Applicant: SAMSUNG ELECTRONICS CO., LTD., Suwon-si (KR)

(72) Inventors: Ho-sun Lee, Seoul (KR); Yong-jin Kang, Suwon-si (KR); Nam-gon Kim, Seoul (KR); Ju-han Bae, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

This patent is subject to a terminal disclaimer.

(21) Appl. No.: 16/148,464

(22) Filed: Oct. 1, 2018

(65) Prior Publication Data

US 2019/0037326 A1 Jan. 31, 2019

Related U.S. Application Data

(63) Continuation of application No. 14/965,305, filed on Dec. 10, 2015, now Pat. No. 10,123,142.

(30) Foreign Application Priority Data

Dec. 11, 2014 (KR) ........................ 10-2014-0178451

(51) Int. Cl.
*H04B 3/00* (2006.01)
*H04R 29/00* (2006.01)
(Continued)

(52) U.S. Cl.
CPC ............. *H04R 29/001* (2013.01); *H04R 3/12* (2013.01); *H04S 7/308* (2013.01);
(Continued)

(58) Field of Classification Search
CPC .................................. H04S 7/308; H04R 3/12
(Continued)

(56) References Cited

U.S. PATENT DOCUMENTS 9,900,477 B2 2/2018 Park et al.
2005/0190928 A1 9/2005 Noto
(Continued)

FOREIGN PATENT DOCUMENTS

CN 201142111 Y 10/2008
CN 103597858 A 2/2014
(Continued)

OTHER PUBLICATIONS

Communication dated Mar. 28, 2018, issued by the European Patent Office in counterpart European Application No. 15198604.9.
(Continued)

*Primary Examiner* — Katherine A Faley
(74) *Attorney, Agent, or Firm* — Sughrue Mion, PLLC

(57) ABSTRACT

Sound output devices, output systems and methods are provided. The sound output device includes a speaker; a communicator configured to perform communication with an external speaker and a content source that provides sound content to the external speaker; and a processor configured to recognize the external speaker in response to the device entering into a predetermined range from the external speaker, to perform pairing with the external speaker, to receive information about the content source from the external speaker, to receive the sound content from the content source based on the information about the content source, and to output the received sound content through the speaker.

11 Claims, 11 Drawing Sheets

(51) Int. Cl.
*H04R 3/12* (2006.01)
*H04S 7/00* (2006.01)

(52) U.S. Cl.
CPC ...... *H04R 2420/05* (2013.01); *H04R 2420/07* (2013.01); *H04R 2430/20* (2013.01)

(58) Field of Classification Search
USPC ...................................................... 381/77, 80
See application file for complete search history.

(56) References Cited

U.S. PATENT DOCUMENTS

| | | | |
|---|---|---|---|
| 2005/0287950 A1 | 12/2005 | Helden et al. | |
| 2008/0025535 A1 | 1/2008 | Rajapakse | |
| 2008/0058972 A1 | 3/2008 | Yoneda | |
| 2010/0015934 A1 | 1/2010 | Kofler | |
| 2011/0158441 A1 | 6/2011 | Batra | |
| 2011/0314153 A1* | 12/2011 | Bathiche | H04L 63/08 709/225 |
| 2012/0058727 A1 | 3/2012 | Cook et al. | |
| 2012/0289155 A1 | 11/2012 | Dua | |
| 2013/0094667 A1 | 4/2013 | Millington et al. | |
| 2013/0294618 A1 | 11/2013 | Lyubachev | |
| 2014/0122589 A1 | 5/2014 | Fyke et al. | |
| 2014/0178028 A1 | 6/2014 | Park et al. | |
| 2014/0226834 A1 | 8/2014 | Kallai et al. | |
| 2015/0215722 A1 | 7/2015 | Milne et al. | |

FOREIGN PATENT DOCUMENTS

| | | | |
|---|---|---|---|
| CN | 103905912 | A | 7/2014 |
| EP | 2750353 | A1 | 7/2014 |
| KR | 1020080079428 | A | 9/2008 |
| KR | 10-2011-0008608 | A | 1/2011 |
| WO | 2012/137190 | A1 | 10/2012 |
| WO | 2014/107469 | A2 | 7/2014 |

OTHER PUBLICATIONS

Communication dated Feb. 2, 2018, issued by the State Intellectual Property Office of P.R. China in counterpart Chinese Application No. 201510909798.6.
Communication dated Mar. 31, 2016, issued by the International Searching Authority in counterpart International Application No. PCT/KR2015/013576.
Communication dated May 10, 2016, issued by the European Patent Office in counterpart European Application No. 15198604.9.
Communication dated Sep. 12, 2018, issued by the State Intellectual Property Office of P.R.China in counterpart Chinese Application No. 201510909798.6 which was filed on Dec. 10, 2015.
Communication dated Feb. 22, 2019 issued by the State Intellectual Property Office of P.R. China in counterpart Chinese Patent Application No. 201510909798.6.
Communication dated May 2, 2019 issued by the Intellectual Property Office of Australia in counterpart Australian Patent Application No. 2015362095.
Communication dated Dec. 16, 2019, issued by the Indian Patent Office in counterpart Indian Application No. 201717023673.
Communication dated Jul. 31, 2020 issued by the Korean Intellectual Property Office in Korean Patent Application No. 10-2014-0178451.
Communication (Summons to Attend Oral Proceedings) dated Sep. 2, 2020 issued by the European Patent Office in European Patent Application No. 15198604.9.
Communication dated Feb. 15, 2021 issued by the European Patent Office for European Patent Application No. 15198604.9.
Communication dated Mar. 22, 2021 issued by the European Patent Office for European Patent Application No. 15198604.9.

* cited by examiner

SOUND OUTPUT DEVICE PAIRING WITH CLOSEST EXTERNAL SPEAKER AND CONTENT SOURCE

PRIORITY

This is a continuation application of U.S. patent application Ser. No. 14/965,305, filed Dec. 10, 2015, in the U.S. Patent and Trademark Office, which claims priority to Korean Patent Application No. 10-2014-0178451 filed on Dec. 11, 2014 in the Korean Intellectual Property Office, the disclosure of which is incorporated herein by reference in its entirety.

BACKGROUND

1. Field

Apparatuses, systems and methods consistent with exemplary embodiments relate to a sound output device, a sound output system, and a control method thereof, and more particularly to a sound output device, a sound output system, and a control method thereof, which can recognize external speakers and output sound content to the external speakers.

2. Description of the Related Art

Technology to transmit an audio signal that is output from a multimedia reproduction device to a plurality of speaker devices that are connected through wireless networks to output the audio signal through the speaker devices has been widely used.

Accordingly, it becomes possible to listen to music or other audio with better sound quality than the audio that is reproduced from an appliance, such as a television (TV), in which speakers have deteriorated sound quality due to the design and structural problems of the appliance, by instead using a plurality of speaker devices that are connected through wireless networks and have speakers with higher sound quality.

However, in the case of outputting sound content through speaker devices that are connected through wireless networks, a user is required to set one by one grouping of the speaker devices and which sound content is outputted to a particular speaker, which may cause inconvenience to the user.

Accordingly, there has been a need for technology that automatically recognizes speakers and makes the recognized speakers output sound content without the necessity of the user to set the speakers one by one.

SUMMARY

Exemplary embodiments address the above needs and provide the advantages described below. However, not all exemplary embodiments are required to address all the needs and provide all the advantages described, and an exemplary embodiment may not necessarily address any described need or advantage. An aspect of the exemplary embodiments provide a sound output device, a sound output system, and a control method thereof, which can recognize external speakers to perform pairing, and receive and output sound content to be output from the external speakers.

According to an aspect of an exemplary embodiment, there is provided a sound output device including a speaker; a communicator configured to perform communication with an external speaker and a content source that provides sound content to the external speaker; and a processor configured to recognize the external speaker in response to the device entering into a predetermined range from the external speaker, to perform pairing with the external speaker, to receive information about the content source from the external speaker, to receive the sound content from the content source based on the information about the content source, and to output the received sound content through the speaker.

The processor may be configured to receive connection information about the content source from the external speaker and to perform communication with the content source on the basis of the received connection information in response to pairing with the external speaker.

The processor may be configured to recognize the external speaker through sensing of at least one of a distance from the external speaker, a position of the external speaker, and an arrangement direction of the external speaker in response to the device entering into the predetermined range from the external speaker.

The processor may be configured to sense at least one of the distance from the external speaker, the position of the external speaker, and the arrangement direction of the external speaker using an ultra-wideband (UWB) system.

The predetermined range may be changeable in accordance with a user operation.

The processor may perform the pairing with a most adjacent external speaker among the plurality of external speakers in response to recognizing a plurality of external speakers.

The processor may be configured to receive sound content from the content source that is identical to sound content output by the most adjacent external speaker in response to paring with the most adjacent external speaker and to output the received identical sound content.

According to an aspect of another exemplary embodiment, there is provided a sound output device including a speaker; a communicator configured to perform communication with a display device that outputs sound content; and a processor configured to recognize the display device in response to the device entering into a predetermined range from the display device, to perform pairing with the display device, to receive the sound content from the display device, and to output the received sound content through the speaker.

According to an aspect of another exemplary embodiment, there is provided a sound output system including a content source; a first sound output device configured to receive sound content from the content source and to output the received sound content; and a second sound output device configured to be movable, to recognize the first sound output device in response to the second sound output device entering into a predetermined range from the first sound output device, to perform pairing with the first sound output device, to receive information about the content source from the first sound output device, to receive the sound content from the content source based on the information about the content source, and to output the received sound content.

According to an aspect of another exemplary embodiment, there is provided a method for controlling a sound output device, the method including recognizing an external speaker that receives and outputs sound content from a content source in response to the device entering into a predetermined range from the external speaker; performing pairing with the recognized external speaker; and receiving information about the content source from the external speaker, receiving and outputting the sound content from the content source based on the basis of information about the content source.

The method may further include receiving connection information about the content source from the external speaker, and performing communication with the content source on the basis of the received connection information in response to pairing with the external speaker.

The recognizing the external speaker may include recognizing the external speaker through sensing of at least one of a distance from the external speaker, a position of the external speaker, and an arrangement direction of the external speaker in response to the device entering into the predetermined range from the external speaker.

The recognizing the external speaker may include sensing at least one of the distance from the external speaker, the position of the external speaker, and the arrangement direction of the external speaker using a ultra-wideband (UWB) system.

The predetermined range may be changeable in accordance with a user operation.

The performing the pairing may include performing the pairing with the most adjacent external speaker among a plurality of external speakers in response to recognizing a plurality of external speakers.

The outputting may include sound content from the content source that is identical to sound content output by the most adjacent external speaker from the content source and outputting the received sound content.

According to an aspect of another exemplary embodiment, there is provided a method for controlling a sound output device, the method including recognizing a display device that outputs sound content in response to the device entering into a predetermined range from the display device and performing pairing with the recognized display device; and receiving and outputting the sound content from the display device.

BRIEF DESCRIPTION OF THE DRAWINGS

The above and/or other will be more apparent from the following detailed description of exemplary embodiments when taken in conjunction with the accompanying drawings, in which.

DETAILED DESCRIPTION OF EXEMPLARY EMBODIMENTS

Hereinafter, exemplary embodiments are described in detail with reference to the accompanying drawings. In describing the exemplary embodiments, well-known element structures and technologies are not described in detail since they would obscure the disclosure in unnecessary detail. Further, terms used in the description are general terms that are used in consideration of their meanings in the present disclosure and should be understood on the basis of the entire contents of the present disclosure.

Figure 1:
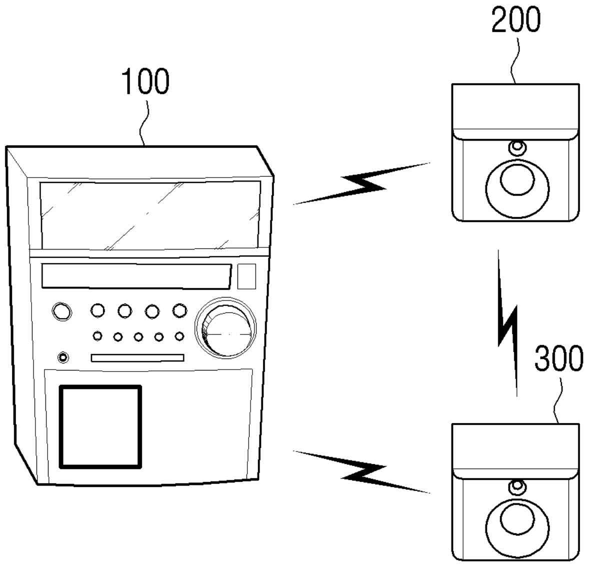
FIG. 1 is a view explaining a configuration of a content source and sound output devices.

FIG. 1 is a view explaining a configuration of a content source and sound output devices.

Referring to FIG. 1, a content source 100, a first sound output device 200, and a second sound output device 300 are illustrated. The content source 100 to provides sound content to the first and second sound output devices 200 and 300, and may be a compact disc (CD) player, a radio receiver, an audio receiver, a display device, a notebook computer, a smart phone, or other device providing audio content.

If the second sound output device 300 approaches (i.e., is moved in the direction of) the first sound output device 200 in a state where the first sound output device 200 is connected to the content source 100 to output the sound content that is provided from the content source 100, the second sound output device 300 may recognize the first sound output device 300.

Thereafter, the second sound output device 300 may perform pairing with the first sound output device 200, and second sound output device 300 can receive the same sound content as the sound content that is outputted from the first sound output device 200 from the content source 100 and output the received sound content.

Here, the first and second sound output devices may be implemented by any speakers that are connectable through networks, and may include any output devices that can output sound content without being limited to the speakers.

The second sound output device 300 will be described in detail with reference to FIG. 2 in order to explain in detail the operation thereof that is performed in the case where the second sound output device 300 approaches the first sound output device 200 in a state where the first sound output device 200 receives the sound content from the content source 100 to output the received sound content as illustrated in FIG. 1. For reference, the sound output device that is explained through FIG. 2 corresponds to the second sound output device 300 of FIG. 1, i.e., the sound output device that approaches the first sound output device 200 that has already output the sound content. That is, the second sound output device 300 of FIG. 1 is the same as the sound output device illustrated in FIG. 2.

Figure 2:
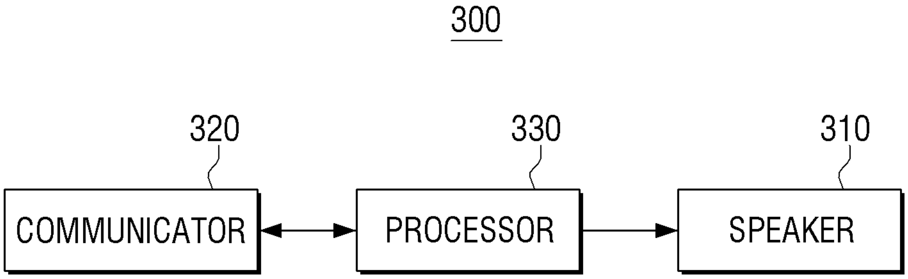
FIG. 2 is a block diagram illustrating the configuration of a sound output device according to an exemplary embodiment.

FIG. 2 is a block diagram illustrating the configuration of a sound output device according to an exemplary embodiment of the present disclosure.

Referring to FIG. 2, the sound output device 300 includes a speaker 310, a communicator 320, and a processor 330.

The speaker 310 outputs sound content, i.e., a sound signal. That is, the speaker 310 may output an audio signal.

The communicator 320 may perform communication with an external speaker, and may also perform communication with a content source that provides the sound content to the external speaker. Here, the external speaker may correspond to the first sound output device 200 as described above with reference to FIG. 1. Further, the communicator 320 may receive the sound content from the content source.

The communicator 320 may perform communication with the external speaker and the content source using various communication systems, such as auxiliary (AUX), wired/wireless LAN (Local Area Network), WAN, Ethernet, Bluetooth, Zigbee, USB (Universal Serial Bus), IEEE 1394, and WiFi.

The processor 330 may recognize the external speaker in the case where the device 300 enters into a predetermined range from the external speaker, perform pairing with the external speaker, receive the sound content from the content source on the basis of information about the content source, which is received from the external speaker, and output the received sound content through the speaker 310.

In general, the processor serves to control the device, and may be a central processing unit, a microprocessor, or a controller, which can control the whole operation of the device. The processor may be implemented by a single chip system (system-on-a-chip or system on chip, SOC, or SoC) in association with other units, such as a recognizer and a communicator.

First, if the device enters into the predetermined range from the external speaker, the processor 330 may recognize the external speaker. In this case, the processor 330 may recognize the external speaker through a sensor (not illustrated) that can be used to determine a position, a distance, and a direction of the speaker.

Specifically, the processor 330 may sense at least one of the distance from the external speaker, the position of the external speaker, and the arrangement direction of the external speaker using an ultra-wideband (UWB) system.

Here, the UWB system is an ultra-wideband wireless technology that transmits a large amount of digital data through a wide spectrum frequency using low power at a short range distance. UWB is also known as a wireless digital pulse. The ultra-wideband wireless device may transmit large capacity data through a distance of about 70 meters at a low power level of about 0.5 mW. This may be compared with Bluetooth, which is another standard short-distance wireless technology that connects wireless devices, such as a smartphone and a desktop computer, to each other, and the ultra-wideband wireless device is featured to simultaneously spread digital pulses through very wide spectrums. Accordingly, the UWB system has low predictable background noise that consumes the power, and thus it is possible to generate an ultra-wideband signal that has no interference in theory.

The processor 330 may sense at least one of the distance from the external speaker, the position of the external speaker, and the arrangement direction of the external speaker using the UWB system, and may determine whether the device enters into the predetermined range from the external device.

In the case where the sound output device 300 enters into the predetermined range from the external speaker, the processor 330 may recognize the external speaker on the basis of at least one of the sensed distance from the external speaker, the position of the external speaker, and the arrangement direction of the external speaker. That is, the processor 330 may sense how long the distance from the external speaker is, or whether the external speaker is on the right side or the left side of the sound output device 300, and may determine the arrangement position of the external speaker based on this sensed information.

Further, in the case where the external speaker and the sound output device 300 are products of the same manufacturer, the external speaker may be recognized through information about the manufacturing number or the serial number of the external speaker.

Thereafter, the processor 330 may perform pairing with the recognized external speaker. Here, the communication connection operation between the external speaker and the processor 330 is referred to as pairing.

If the communication connection is made between the external speaker and the processor 330, the communication may be performed through one of unidirectional wireless communication and bidirectional wireless communication. Specifically, the unidirectional wireless communication may include not only communication using an infrared (IR) signal or a radio frequency (RF) signal, but also communication using a near field wireless communication tag system, such as NFC (Near Field Communication).

Further, the bidirectional wireless communication may be an interactive communication system, in which a transmission side and a reception side may exchange information with each other, unlike the unidirectional wireless communication, and may include communication using various communication systems, such as wireless LAN (Local Area Network), WAN, Ethernet, Bluetooth, Zigbee, IEEE 1394, and WiFi.

If the pairing between the external speaker and the processor 330 is completed and the communication connection between them starts, the processor 330 may receive information about the content source from the external speaker, and receive the sound content from the content source on the basis of the received information about the content source to output the received sound content.

Specifically, if the pairing with the external speaker is performed, the processor 330 may receive connection information of the content source from the external speaker, and perform communication with the content source on the basis of the received connection information.

Here, the connection information of the content source may include SSID (Service Set Identifier) and key information for connecting to the content source.

The SSID is an inherent identifier that is added to a header of each packet that is transmitted through the wireless communication. Specifically, the SSID is text data that is used when devices that use wireless communication connect to a BSS (Basic Service Set), and discriminates between one wireless LAN and another wireless LAN. Accordingly, all devices that intend to connect to a specific wireless LAN must use the SSID that is used in the specific wireless LAN, and if the SSID is changed, it becomes unable to connect to a desired BSS.

Further, the key information may include information about a connection code for connecting to an access point.

Further, the processor 330 may receive the sound content from the communication-connected content source and output the received sound content through the speaker 310. Here, the sound content that is received from the content source may be the same sound content as the sound content that is outputted from the external speaker with which the pairing has been performed.

More specifically, the processor 330 may perform communication with the content source on the basis of the connection information of the content source, and request and receive the sound content that is provided to the external speaker from the content source.

Further, the processor 330 may perform communication with the content source on the basis of the connection information of the content source, and if the communication with the processor 330 is made, the content source may automatically transmit the same sound content as the sound content that is provided to the existing external speaker to the sound output device 300.

Here, in order to synchronize the sound content that is provided to the external speaker and the sound content that is transmitted to the sound output device 300, the content source may transmit synchronization information of the sound content to the sound output device 300.

Accordingly, the processor 330 may output the received sound content through the speaker 310, and if the synchronization information is received, the processor 330 may perform synchronization with the external speaker on the basis of the synchronization information to output the sound content in a synchronized fashion.

On the other hand, in the case where the processor 330 determines whether device 300 enters into the predetermined range from the external speaker, the predetermined range may be changeable in accordance with a user operation. For example, in the case where a user sets the predetermined range to a radius of 5 m from the external speaker, the processor 330 may recognize the external speaker and perform pairing with the external speaker when the device 300 enters into the radius range of 5 m from the external speaker. In the case where a user sets the predetermined range to a radius of 4 m, the processor 330 may recognize the external speaker and perform pairing with the external speaker when the device 300 enters into the radius range of 4 m from the external speaker.

That is, the user may adjust the recognition degree between a plurality of speakers through adjustment of the predetermined range of the external speaker. In general, as the predetermined range becomes larger, the recognition between the speakers occurs frequently, while as the predetermined range becomes smaller, the recognition between the speakers occurs rarely.

Figure 3:
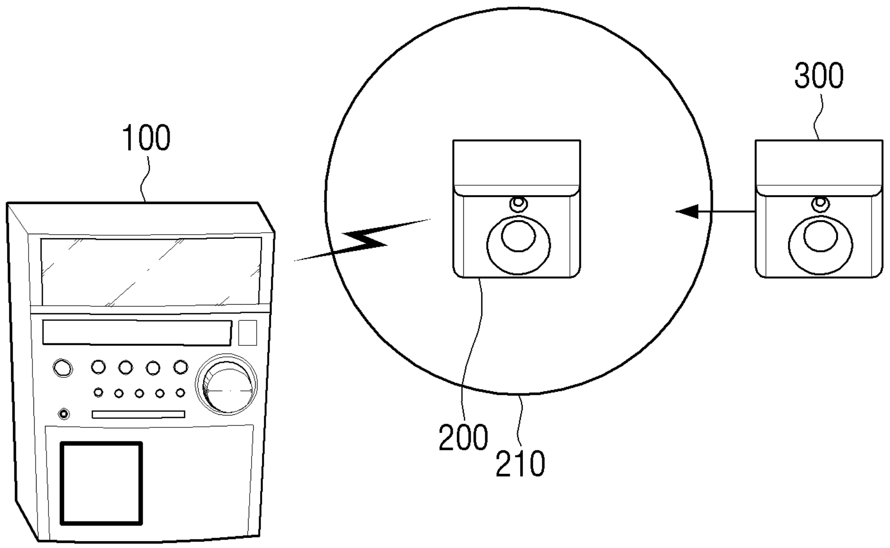
FIG. 3 is a view illustrating a sound output device that enters into a predetermined range of an external speaker according to an exemplary embodiment.

FIG. 3 is a view illustrating a sound output device that enters into a predetermined range of an external speaker according to an exemplary embodiment.

Referring to FIG. 3, it can be known that the external speaker 200 is receiving the sound content from the content source 100 to output the received sound content, and the predetermined range 210 is set around the external speaker 200.

Here, if the sound output device 300 enters into the predetermined range 210 around the external speaker 200, the processor 330 may recognize the external speaker 200 and perform pairing with the external speaker 200.

If the pairing with the external speaker 200 is performed, the processor 330 may receive the connection information of the content source 100 from the external speaker 200, and receive the same or identical sound content as the sound content that is currently being output from the external speaker 200 from the content source 100 through performing of communication with the content source 100.

Accordingly, the external speaker 200 and the sound output device 300 may output the same sound content.

On the other hand, if the processor 330 enters into the predetermined range around the external speaker 200, a process in which the processor 330 recognizes the external speaker 200 through sensing of at least one of the distance from the external speaker 200, the position of the lower speaker 200, and the arrangement direction of the external speaker 200, and a process in which the processor 330 senses at least one of the distance from the external speaker 200, the position of the lower speaker 200, and the arrangement direction of the external speaker 200 using the UWB system may be applied in the same manner as described above with reference to FIG. 3.

Further, the predetermined range around the external speaker 200 may be changeable in accordance with the user operation in the same manner as described above with reference to FIG. 3.

FIG. 3 illustrates that only one external speaker 200 exists, and this may be applied to a case where the content source 100 reproduces the sound content in a mono mode rather than in a surround mode.

It may be also assumed that a plurality of external speakers exist rather than only one external speaker 200.

In this case, if the plurality of external speakers are recognized, the processor 330 may perform the pairing with the most adjacent or closest external speaker among the plurality of external speakers relative to the sound device. Thus, the pairing will be performed with the external speaker determined to be closes to the sound device.

Then, the processor 330 may receive the same sound content as the sound content that is output from the most adjacent external speaker from the content source to output the received sound content.

Figure 4:
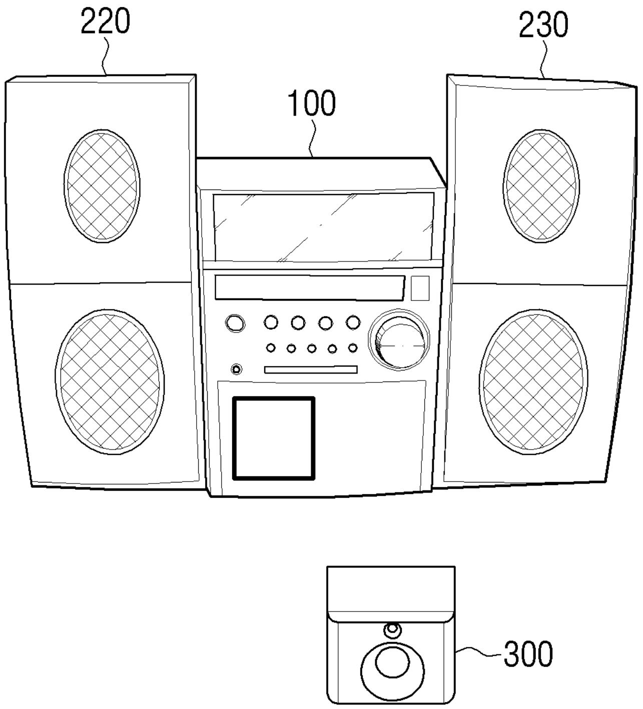
FIGS. 4 and 5 are views explaining a plurality of external speakers and a sound output device according to exemplary embodiments.
Figure 5:
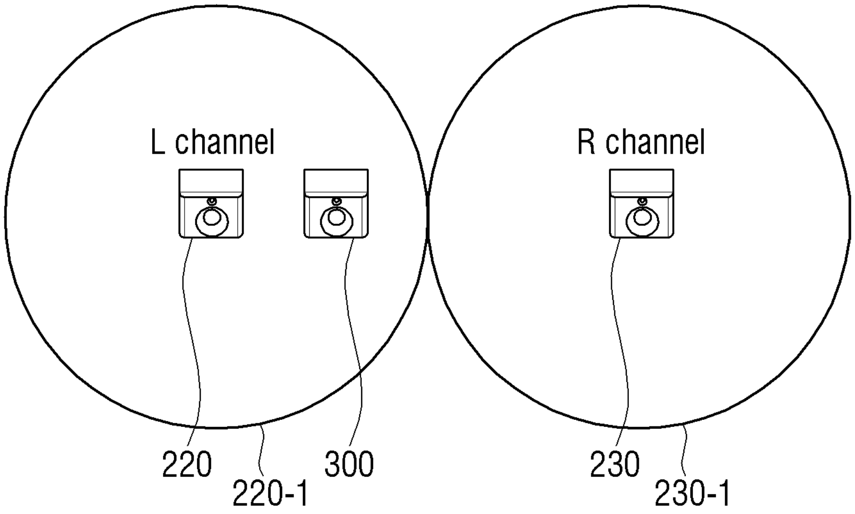

FIGS. 4 and 5 are views explaining a plurality of external speakers and a sound output device according to exemplary embodiments.

Referring to FIG. 4, a content source 100 and a plurality of external speakers 220 and 230 are arranged. Here, if the sound output device 300 approaches the plurality of external speakers 220 and 230, it may simultaneously enter into predetermined ranges that are set with respect to the plurality of external speakers.

In this case, the processor 330 may recognize the plurality of external speakers 220 and 230, and perform pairing with the external speaker 230 that is closest to the sound output device 300 among the plurality of external speakers 220 and 230. In FIG. 4, it is assumed that a distance between the external speaker 230 that is arranged on the right side and the sound output device 300 is relatively shorter than a distance between the external speaker 220 that is arranged on the left side and the sound output device 300.

On the other hand, if a plurality of external speakers exist as illustrated in FIG. 4, it may be assumed that the content source 100 reproduces the sound content in a surround mode, and in this case, the sound content that is outputted from the left external speaker 220 may be different from the sound content that is outputted from the right external speaker 230.

Accordingly, the processor 330 of the sound output device 300 may perform pairing with the external speaker 230 that is closest to the sound output device 300, and then receive the same sound content as the sound content that is outputted from the closest external speaker 230 to output the received sound content.

For example, if it is assumed that the left external speaker 220 outputs the bass portion of the sound content and the right external speaker 230 outputs the treble portion of the sound content, the processor 330 of the sound output device 300 may receive the treble portion of the sound content that is outputted from the right external speaker 230 that is closest to the sound output device 300 to output the received treble portion of the sound content.

FIG. 5 is a view explaining the assumed situation of FIG. 4 in more detail. Referring to FIG. 5, an L-channel external speaker 220 on the left and an R-channel external speaker 230 on the right are arranged in predetermined ranges 220-1 and 230-1, respectively.

If the sound output device 300 enters into the predetermined range 220-1 from the L-channel external speaker 220 and recognizes the L-channel external speaker 220, the sound output device 300 may perform pairing with the L-channel external speaker 220, and receive the same sound content as the L-channel sound content that is output from the L-channel external speaker 220 to output the received sound content through performing of communication with the content source through the connection information of the content source that is received from the L-channel external speaker 220.

FIG. 5 illustrates that the predetermined ranges of the L-channel external speaker 220 and the R-channel external speaker 230 do not overlap each other. However, the predetermined ranges of the L-channel external speaker 220 and the R-channel external speaker 230 may overlap each other, and in this case, if the sound output device 300 is arranged on the overlapping portion, the processor 330 may simultaneously recognize the L-channel external speaker 220 and the R-channel external speaker 230. In this case, the processor 330 performs pairing with the external speaker that is closest to the sound output device 300 between the L-channel external speaker 220 and the R-channel external speaker 230, and outputs the same sound content as the sound content that is outputted from the closest external speaker.

Here, as described above, the processor 330 may sense at least one of the distance from the external speaker, the position of the external speaker, and the arrangement direction of the external speaker using the UWB system, and sense the external speaker that is closest to the sound output device 300 among the plurality of external speakers based on this.

In the above-described example, it is described that the content source and the external speaker are separated from each other. However, the processor 330 of the sound output device 300 may operate in the same manner even with respect to a device that simultaneously outputs video content and sound content, such as a display device.

Figure 6:
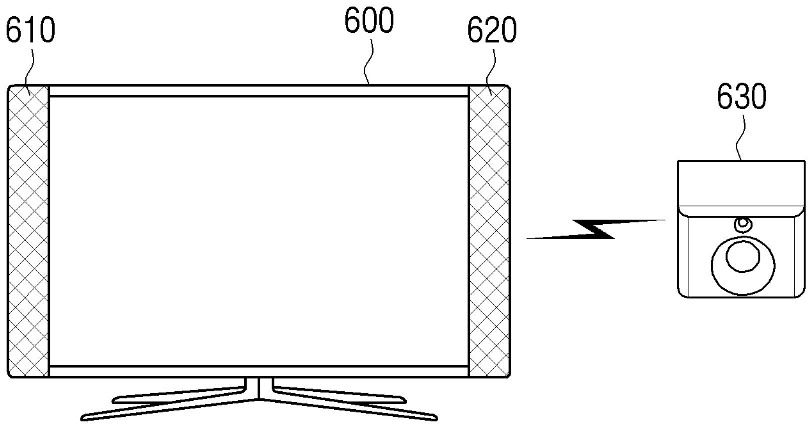
FIG. 6 is a view illustrating a display device and a sound output device according to an exemplary embodiment.

FIG. 6 is a view illustrating a display device and a sound output device according to an exemplary embodiment of the present disclosure.

Referring to FIG. 6, a display device 600 may be provided with a left external speaker 610 and a right external speaker 620, and a sound output device 630 may perform pairing with the display device 600 and receive the sound content from the paired display device to output the received sound content.

Specifically, the sound output device 630 may include the speaker (not illustrated), the communicator (not illustrated), and the processor (not illustrated) as illustrated in FIG. 1. The communicator (not illustrated) may perform communication with the display device 600 that outputs the sound content, and the processor (not illustrated) may recognize the display device 600 to perform pairing with the display device 600 in the case where the device enters into the predetermined range from the display device 600 and receive the sound content from the display device to output the received sound content through the speaker (not illustrated).

That is, in the case of performing pairing between the display device 600 and the sound output device 630, it is not required to separately send and receive the connection information, and the sound output device 630 may perform pairing with the display device 600, and receive the sound content that is being outputted from the display device 600 to output the received sound content.

Further, in the case where the display device 600 is provided with the left external speaker 610 and the right external speaker 620, the sound output device 630 may recognize the external speaker that is closest to the sound output device 630 in a state where the sound output device 630 is paired with the display device 600, and then request the sound content that is being provided to the external speaker that is closest to the display device 600.

Accordingly, the sound output device 630 may receive the same sound content as the sound content that is being provided to the closest external speaker from the display device 600 to output the received sound content.

Figure 7:
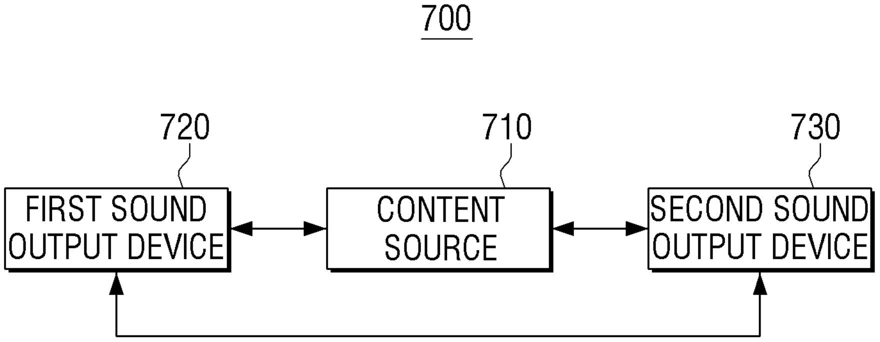
FIG. 7 is a block diagram illustrating the configuration of a sound output system according to an exemplary embodiment.

FIG. 7 is a block diagram illustrating the configuration of a sound output system according to an exemplary embodiment.

Referring to FIG. 7, a sound output system 700 includes a content source 710, a first sound output device 720, and a second sound output device 730.

The first sound output device 720 may receive sound content from the content source 710 to output the received sound content, and the second sound output device 730 is movable. In the case where the second sound output device 730 enters into a predetermined range from the first sound output device 720, the second output system may recognize the first sound output device 720, perform pairing with the first sound output device 720, receive the sound content from the content source 710 on the basis of information about the content source 710, which is received from the first sound output device 720, and output the received sound content.

The content source 710, the first sound output device 720, and the second sound output device 730 as illustrated in FIG. 7 may respectively correspond to the content source 100, the external speaker 200, and the sound output device 300 of FIG. 3.

Further, the operational processes among the devices as described above with reference to FIG. 3 may be applied to the sound output system of FIG. 7 in the same manner.

On the other hand, although not illustrated in FIG. 7, it may also be assumed that a third sound output device (not illustrated) approaches the first sound output device 720 in a state where the second sound output device 730 performs pairing with the first sound output device 720 and outputs the sound content in the same manner as the first sound output device 720.

In this case, if the third sound output device (not illustrated) enters into the predetermined range from the first sound output device 720, it may recognize the first sound output device 720 in the same manner as described above, perform pairing with the first sound output device 720, and output the sound content.

However, if the third sound output device (not illustrated) enters into the predetermined range from the second sound output device 730, it may perform pairing with the second sound output device 730, receive the connection information of the content source 710, and receive the sound content directly from the content source 710 to output the received sound content. In this case, however, the second sound output device 730 may serve as a repeater.

Specifically, the second sound output device 730 may output the sound content that is received from the content source 710, and simultaneously transmit the sound content to the paired third sound output device (not illustrated), so that the third sound output device (not illustrated) can output the sound content.

Here, a transmission delay that is generated in the process in which the second sound output device 730 transmits the sound content to the third sound output device (not illustrated) may cause a problem. However, such a transmission delay can be reduced by using a WiFi Direct communication connection or similar direct wireless communication, in which the user is unable to recognize the transmission delay.

Figure 8:
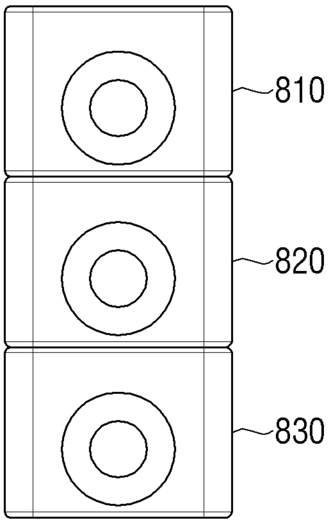
FIGS. 8 and 9 are views explaining technical effects according to exemplary embodiments of the present disclosure.
Figure 9:
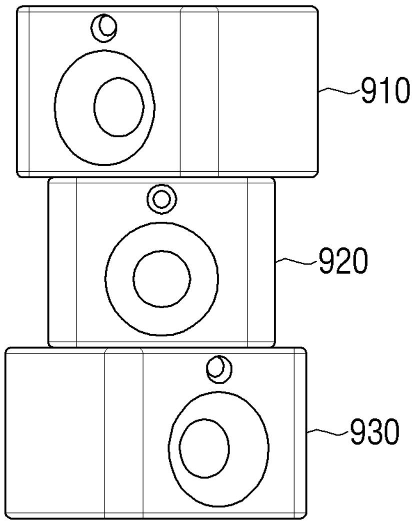

FIGS. 8 and 9 are views explaining technical effects according to an exemplary embodiment.

Referring to FIG. 8, three sound output devices 810, 820, and 830 recognize one another, perform pairing with one another, and output the same sound content. Accordingly, the output attenuation occurs slowly in comparison to a case where one sound output device 830 outputs the sound content.

For example, in the case where a single speaker, i.e., one sound output device 830, outputs the sound content (e.g., a single point source), the output of the sound content is reduced by 6 dB whenever the distance from the source doubles. However, in the case where the plurality of sound output devices 810, 820, and 830 simultaneously output the sound content (e.g., a multi-point source), the output of the sound content is only reduced by 3 dB whenever the distance from the source doubles.

That is, in the case of outputting the sound content using the plurality of sound output devices 810, 820, and 830, a sound gain of 3 dB can be obtained per unit distance.

On the other hand, referring to FIG. 9, three sound output devices 910, 920, and 830 are respectively arranged so that their output directions differ from one another, for example, on the left side, in the front, and on the right side. In this case, the directivity is increased.

The technical effects according to an exemplary embodiment as described above with reference to FIGS. 8 and 9 may be implemented by recognizing and performing pairing among the plurality of sound output devices and receiving and outputting the same sound content from the content source.

Figure 10:
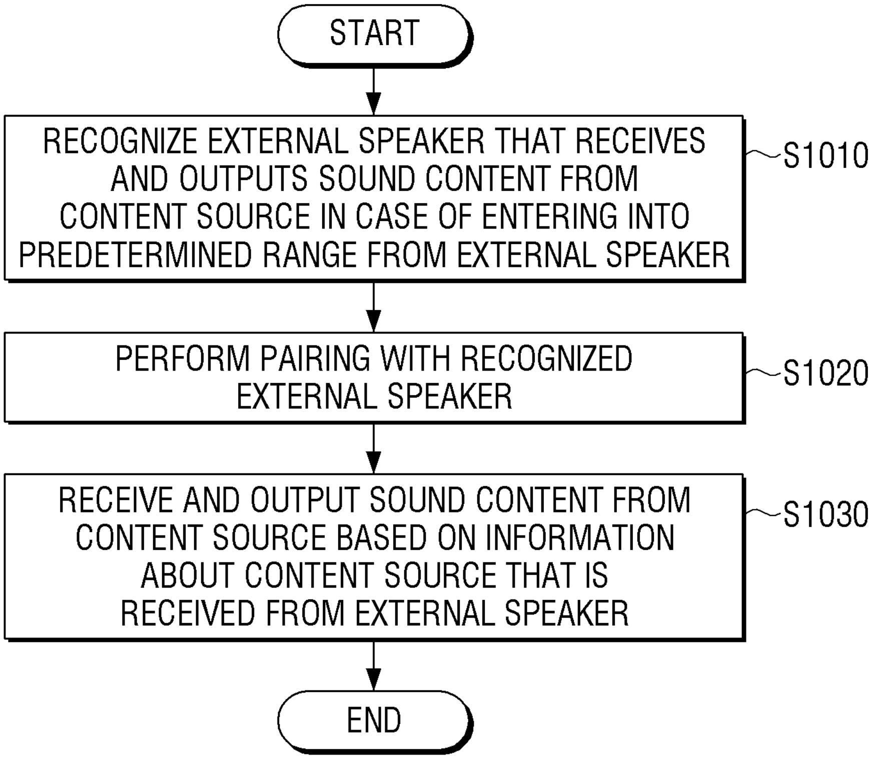
FIG. 10 is a flowchart explaining a method for controlling a sound output device according to an exemplary embodiment.

FIG. 10 is a flowchart explaining a method for controlling a sound output device according to an exemplary embodiment.

According to the method as illustrated in FIG. 10, in the case where the sound output device enters into a predetermined range from an external speaker that receives and outputs sound content from a content source, the device recognizes the external speaker (S1010).

Then, the device performs pairing with the recognized external speaker (S1020).

Further, the device receives the sound content from the content source on the basis of information about the content source, which is received from the external speaker, to output the received sound content (S1030).

Here, the method for controlling a sound output device according to an exemplary embodiment may further include in the case where the pairing with the external speaker is performed, receiving connection information about the content source from the external speaker, and performing communication with the content source on the basis of the received connection information.

Further, the recognizing the external speaker may include recognizing the external speaker through sensing of at least one of a distance from the external speaker, a position of the external speaker, and an arrangement direction of the external speaker in the case where the device enters into the predetermined range from the external speaker.

Further, the recognizing the external speaker may include sensing at least one of the distance from the external speaker, the position of the external speaker, and the arrangement direction of the external speaker using an ultra-wideband (UWB) system.

The predetermined range may be changeable in accordance with a user operation.

On the other hand, the performing the pairing may include in the case where a plurality of external speakers are recognized, performing the pairing with the most adjacent external speaker among the plurality of external speakers.

Further, the outputting may include receiving the same sound content as the sound content that is outputted from the most adjacent external speaker from the content source and outputting the received sound content.

Figure 11:
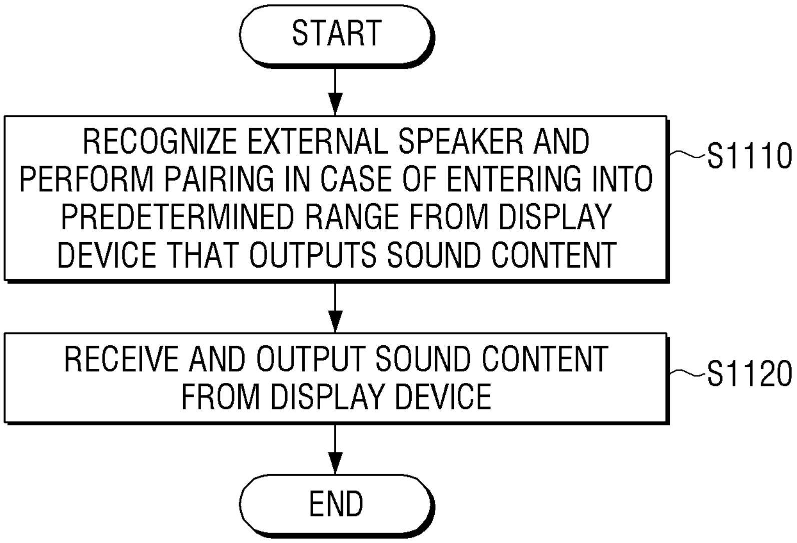
FIG. 11 is a flowchart explaining a method for controlling a sound output device according to another exemplary embodiment.

FIG. 11 is a flowchart explaining a method for controlling a sound output device according to another exemplary embodiment.

According to the method as illustrated in FIG. 11, the device may recognize a display device that outputs sound content in the case where the device enters into a predetermined range from the display device and perform pairing with the recognized display device (S1110).

Then, the device may receive the sound content from the display device and output the received sound content (S1120).

In addition, a non-transitory computer readable medium may be provided, which stores therein a program which is executed by a computer or processor for successively performing the control methods according to the exemplary embodiments.

As an example, a non-transitory computer readable medium may be provided, which stores therein a program for performing recognizing an external speaker that receives and outputs sound content from a content source in the case where the device enters into a predetermined range from the external speaker, performing pairing with the recognized external speaker, and receiving and outputting the sound content from the content source on the basis of information about the content source, which is received from the external speaker.

Further, as an example, a non-transitory computer readable medium may be provided, which stores therein a program for performing recognizing a display device that outputs sound content in the case where the device enters into a predetermined range from the display device and performing pairing with the recognized display device, and receiving and outputting the sound content from the display device.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a CD, a digital versatile disc (DVD), a hard disc, a Blu-ray disc, a USB storage, a memory card, and a read only memory (ROM).

Further, in the block diagram illustrating the content source, the external speaker, and the sound output device, a bus is not illustrated. However, communication among respective constituent elements of the content source, the external speaker, and the sound output device may be performed through the bus. Further, each device may further include a processor, such as a CPU or a microprocessor, which performs the various functions as described above.

As described above, according to various exemplary embodiments of the present disclosure, user's convenience is increased through the automatic recognition and pairing between the speakers, and the output of the speaker can be heightened through configuring of several speakers per channel. Further, the directivity can be heightened through changing of the directions of the speakers that output the same sound.

While exemplary embodiments have been shown and described, it will be understood by those skilled in the art that various changes in form and detail may be made therein without departing from the spirit and scope of the inventive concept, as defined by the appended claims.

What is claimed is:

1. A sound output device comprising:
a speaker;
a transceiver; and
a processor configured to:
control, based on the sound output device being positioned within a predetermined range from a plurality of external speakers, the transceiver to perform pairing with an external speaker closest to the sound output device, wherein each of the plurality of external speakers outputs a different portion of a sound content; and
control the transceiver to perform pairing with a content source based on information about the content source received from the paired external speaker to:
initiate a bidirectional communication link with the content source;
request the content source to transmit a portion of the sound content through the bidirectional communication link, which is output by the paired external speaker;
receive a first signal including the requested portion of the sound content through the bidirectional communication link, the first signal being transmitted from the content source in accordance with the request and being different from a second signal including the sound content transmitted from the content source to the paired external speaker; and
control the speaker to output a same portion of the sound content output by the paired external speaker.

2. The sound output device as claimed in claim 1, wherein the processor is configured to control, based on pairing with the external speaker closest to the sound output device, the transceiver to receive connection information about the content source from the paired external speaker and to perform pairing with the content source based on the received connection information.

3. The sound output device as claimed in claim 1, wherein the processor is configured to, based on the sound output device entering into the predetermined range from the plurality of external speakers, recognize the plurality of external speakers based on sensing of at least one of a distance from the plurality of external speakers, a position of the plurality of external speakers, and an arrangement direction of the plurality of external speakers.

4. The sound output device as claimed in claim 3, wherein the processor is configured to recognize the plurality of external speakers based on sensing at least one of the distance from the plurality of external speakers, the position of the plurality of external speakers, and the arrangement direction of the plurality of external speakers using an ultra-wideband (UWB) system.

5. The sound output device as claimed in claim 1, wherein the predetermined range is changeable in accordance with a user operation.

6. A method for controlling a sound output device, the method comprising:
recognizing a plurality of external speakers based on the sound output device being positioned within a predetermined range from the plurality of external speakers, wherein each of the plurality of external speakers outputs a different portion of a sound content;
performing pairing with an external speaker closest to the sound output device;
receiving information about a content source from the paired external speaker;
performing pairing with the content source based on the information about the content source;
initiating a bidirectional communication link with the content source
requesting the content source to transmit a portion of the sound content through the bidirectional communication link, which is output by the paired external speaker;
receiving a first signal including the requested portion of the sound content, the first signal being transmitted from the content source in accordance with the request and being different from a second signal including the sound content transmitted from the content source to the paired external speaker; and
outputting a same portion of the sound content output by the paired external speaker.

7. The method as claimed in claim 6, further comprising, based on the pairing with the external speaker closest to the sound output device, receiving connection information about the content source from the paired external speaker, and performing pairing with the content source based on the received connection information.

8. The method as claimed in claim 6, wherein the recognizing the plurality of external speakers comprises based on the sound output device being within the predetermined range from the plurality of external speakers, recognizing the plurality of external speakers through sensing of at least one of a distance from the plurality of external speakers, a position of the plurality of external speakers, and an arrangement direction of the plurality of external speakers.

9. The method as claimed in claim 8, wherein the recognizing the plurality of external speakers comprises sensing at least one of the distance from the plurality of external speakers, the position of the plurality of external speakers, and the arrangement direction of the plurality of external speakers using an ultra-wideband (UWB) system.

10. The method as claimed in claim 6, wherein the predetermined range is changeable in accordance with a user operation.

11. A sound output system comprising:
a content source;
a plurality of sound output devices configured to receive a sound content from the content source, wherein each of the plurality of sound output devices outputs a different portion of the sound content; and
a first sound output device configured to be movable, and configured to:
based on the first sound output device being positioned within a predetermined range from the plurality of sound output devices, perform pairing with a second sound output device closest to the first sound output device,
perform pairing with the content source based on information about the content source received from the second sound output device;
initiate a bidirectional communication link with the content source;

request the content source to transmit a portion of the sound content through the bidirectional communication link, which is output by the second sound output device;

receive a first signal including the requested portion of the sound content through the bidirectional communication link, the first signal being transmitted from the content source in accordance with the request and being different from a second signal including the sound content transmitted from the content source to the paired second sound output device; and output a same portion of the sound content output by the second sound output device.

* * * * *